June 2, 1964  R. MÜLLER ETAL  3,135,426
PROCESS AND APPARATUS FOR DETERMINING THE RATE
OF FLOW OF A PARTICULATE MATERIAL
Filed Feb. 16, 1960  2 Sheets-Sheet 2

INVENTORS
Rudolf Müller
Werner Lessnig
Gerhard Gerrler
BY
Michael J. Striker

United States Patent Office 3,135,426
Patented June 2, 1964

3,135,426
PROCESS AND APPARATUS FOR DETERMINING THE RATE OF FLOW OF A PARTICULATE MATERIAL
Rudolf Müller, Grunwald, near Munich, Werner Lessnig, Cologne-Flittard, and Gerhard Gassler, Leverkusen, Germany, assignors, by mesne assignments, to Farbenfabriken Bayer Aktiengesellschaft, Leverkusen, Germany
Filed Feb. 16, 1960, Ser. No. 9,025
Claims priority, application Germany Feb. 19, 1959
5 Claims. (Cl. 222—55)

The present invention relates to a process and apparatus for determining the rate of flow of a particulate material.

Very often it is necessary to lead a granular particulate material at a predetermined rate to a given location, as when mixing various materials together, or the like. At the present time there is no really satisfactory solution to the problem of precisely determining the rate of flow of a particulate material which is flowing continuously.

It is known, for example, to provide a conveyor belt carried by a pair of rollers one of which is driven and to support this entire assembly of conveyor belt, rollers, and drive for one of the rollers on a balance scale or the like so that this assembly forms one part of the balance which receives the flowing particulate material and weighs the same. This arrangement has serious faults since the conveyor system itself weighs so much that relatively small rates of flow of the particulate material cannot be measured with any degree of accuracy, and furthermore the tare weight of the assembly remains inconstant because some of the particulate material falls off the conveyor belt and because some of this particulate material sticks permanently to the conveyor belt and thus the tare weight of the assembly is uncontrollable.

It is also known to direct the particulate material into a container which opens automatically or which is inverted automatically to discharge its contents when it has been filled to a predetermined extent, and while it is possible in this way to measure and control the rate of flow of a particulate material, it is not possible to do so continuously, and continuous flow is essential to certain operations so that the problem is not at all solved by such containers. Moreover, if it is desired to maintain a certain minimum accuracy the speed with which such containers are filled and emptied is limited so that one cannot obtain the desired speed of flow.

Furthermore, the known ways of measuring and controlling the rate of flow of a particulate material are rendered inaccurate because they are influenced, for example, by the kinetic energy of the moving particulate material and the impact of this material on certain parts will also render the known arrangements inaccurate.

It is, accordingly, a primary object of the present invention to provide a process and apparatus which will render it possible to measure and control with a high degree of accuracy the rate of flow of a particulate material which is continuously flowing.

A further object of the present invention is to provide a process and apparatus which will be uninfluenced by the kinetic energy of the flowing material.

It is also an object of the present invention to provide a process and apparatus which can accurately handle an extremely small amount of particulate material per unit of time.

It is furthermore an object of the present invention to provide a process and apparatus which is uninfluenced by such factors as the particulate material adhering to the structure of the invention.

Still another object of the present invention is to provide a process and apparatus according to which the friction of the moving parts can be ignored.

A still further object of the present invention is to provide a process and apparatus according to which measurements are made without disturbing the operation of the parts by engaging them in any way.

It is also among the objects of the invention to provide a fully automatic structure capable not only of measuring the rate of flow of a particulate material which is continuously flowing but also of capable of controlling, automatically, if desired, the rate of flow so as to regulate the rate of flow of the particulate material in order to bring this rate of flow to a desired value.

It is in addition an object of the invention to provide a structure and process which are characterized by extreme simplicity and which at the same time are very reliable in operation.

With the above objects in view the invention includes in a process for measuring the rate of flow of a particulate material along a given path, the steps of dropping the material as it flows along this path on a freely turnable rotary means which is rotated by the particulate material falling onto the same, and then measuring a characteristic of the rotation of the rotary means, this characteristic being, for example, the turning moment applied to the rotary means by the particulate material falling onto the same or the speed of rotation of the rotary means induced by the falling of the particulate material onto the same, and then from this measured characteristic it is possible to determine the rate of flow of the particulate material, this rate of flow being indicated directly, if desired, from the measured characteristic of the rotation of the rotary means.

Also, with the above objects in view, the invention includes an apparatus for measuring the rate of flow of a particulate material along a given path, this apparatus including a wheel which has an axis and which carries a plurality of pockets distributed uniformly about this axis and directed away from this axis. A support means supports the wheel for free rotation about its axis, and a supply means is located at an elevation higher than the wheel for dropping onto the latter the particulate material which is flowing along the said path, so that the wheel is rotated by the falling particulate material which enters into the pockets of the wheel. A means is provided according to the present invention for measuring a characteristic of the rotation of the wheel so as to indicate from this measurement the rate of flow of the particulate material.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 3:
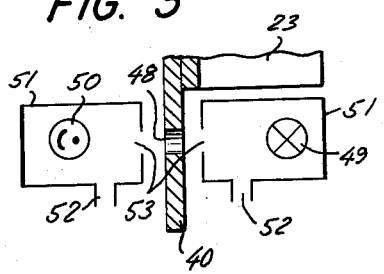
Figure 4:
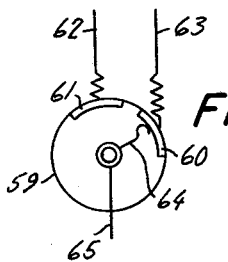

FIG. 3 is a fragmentary diagrammatic illustration of a structure according to the invention for participating in a measurement of the speed of rotation of a wheel or rotary means of the invention; and FIG. 4 is a fragmentary diagrammatic illustration of a structure capable of automatically regulating the rate of flow of the particulate material so that this rate of flow will have a preselected value.

Figure 1:
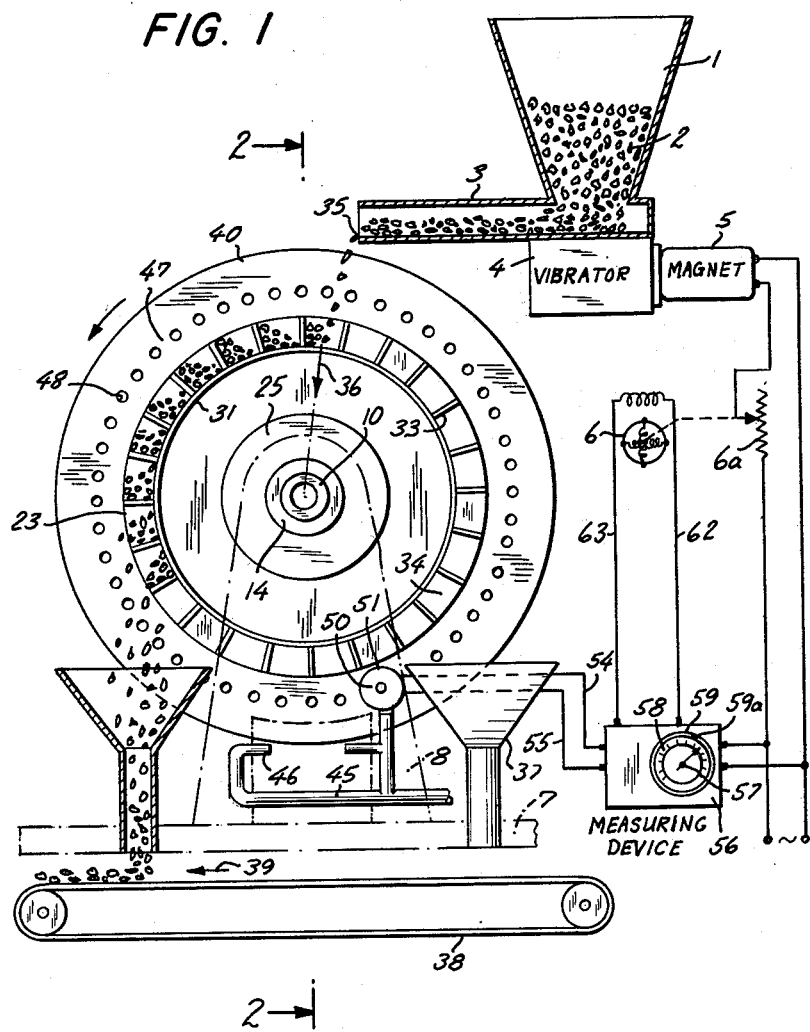
FIG. 1 is a partly schematic side elevation of one possible embodiment of a structure according to the present invention, FIG. 1 being taken along line 1—1 of FIG. 2 in the direction of the arrows.

Referring to FIG. 1 of the drawings, it will be seen that a hopper 1 is illustrated therein, this hopper containing the particulate material whose flow is to be measured and regulated according to the invention. The particulate material 2 is located in the hopper 1 and can flow out through the bottom open end thereof. The hopper 1 is stationary and is supported by any suitable framework.

Beneath the hopper 1 is located a supply means for supplying the particulate material to a rotary means of the invention described below, and this supply means includes the elongated chute 3 which is carried by a vibrator 4 of a well known construction which when acted upon by the self-interrupting electromagnet assembly 5 causes the chute to vibrate and advance the particulate material 2 to the left, as viewed in FIG. 1, along the chute 3 until the particulate material falls from the end 35 of the chute 3.

The structure of the vibrator 4 and the electrical magnet assembly 5 which cooperates therewith is well known and forms no part of the present invention. The amplitude of vibration imparted to the vibrator 4 through the magnet assembly 5 is regulated by a variable resistor 6a. This variable resistor 6a is controlled by a motor 6 which is operated in a manner described below to set the variable resistor 6a which serves as an actuating means controlled by the motor 6 and cooperating with the magnet assembly 5 for actuating the latter to operate at a predetermined amplitude so as to control the vibrator 4 which will vibrate the chute 3 with a corresponding amplitude of vibration.

Figure 2:
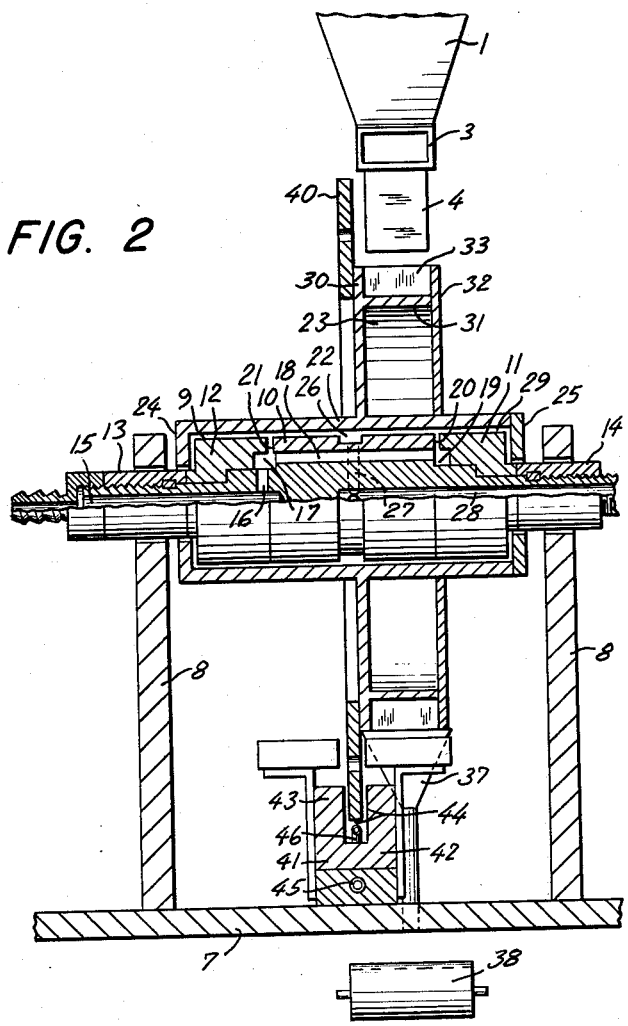
FIG. 2 is a transverse section of the structure of FIG. 1 taken along line 2—2 of FIG. 1 in the direction of the arrows.

As may be seen from FIG. 2 as well as FIG. 1, the structure of the invention includes a base plate 7 from which a pair of side plates 8 extend, these plates 8 being fixed to and extending upwardly from the base plate 7. The plates 8 serve to support a support means for the rotary means of the invention described below, and this support means takes the form of an air-bearing means 9 carried by the side plates 8.

The air-bearing means 9 includes a shaft 10 which carries a pair of sleeves 11 and 12. At its left end portion, as viewed in FIG. 2, the shaft 10 carries a sleeve 13 which serves to connect the air-bearing means 9 with a supply of compressed air, and the right end of the shaft 10, as viewed in FIG. 2, is connected with a sleeve 14 serving to connect the shaft 10 with a structure through which the air is discharged.

The left end portion of the shaft 10 of FIG. 2 is formed with an axial bore 15 which receives the air under pressure, and this bore 15 communicates with a radial bore 16 of the shaft 10 so that the air under pressure moves from the bore 15 out through the radial bore 16. As is apparent from FIG. 2 the shaft 10 and the sleeve 12 are stepped and define between each other an annular chamber 17 which receives the compressed air from the bore 16. This chamber 17 communicates with an axial bore 18 of the shaft 10, and at its right end, as viewed in FIG. 2, the bore 18 communicates with an annular chamber 19 formed between the stepped right end of the shaft 10, as viewed in FIG. 2 and the stepped sleeve 11. The sleeve 12 defines around the chamber 17 with the central portion of the shaft 10 an annular gap 21 having a width of approximately 0.03 mm., and a gap 20 of the same size is provided between the sleeve 11 and the shaft 10. If desired, these annular gaps 20 and 21 may be replaced by radial bores.

This air-bearing structure described above serves to support for rotation a rotary means in the form of a wheel which has a hollow hub 22 in which the shaft 10 and the sleeves 11 and 12 are located. The wheel 23 whose hub 22 encloses the sleeves 11 and 12 as well as most of the shaft 10 is supported with this structure for a practically friction-free rotation. The hub 22 surrounds the shaft 10 and the sleeves 11 and 12 with a radial clearance or play 29 of 0.04 mm. At its left end the hub 22 of the wheel 23 is provided with an end wall 24 which is formed with a central bore through which the shaft 10 extends and into which parts of elements 12 and 13 extend, and at its right end, as viewed in FIG. 2, the hub 22 has a similar end wall in form of a separated cover 25 which is centrally bored and through which the shaft 10 extends and into which parts of the sleeve 11 and the connecting element 14 extend, as shown in FIG. 2. It will be noted that the exterior diameter of the sleeves 11 and 12 are equal to the exterior diameter of the central portion of the shaft 10, and at their annular faces which are directed toward the end walls 24 and 25, the sleeves 12 and 11 respectively have an axial clearance or play of 0.20 mm. The central portion of the shaft 10 is formed with an exterior circular groove 26 which communicates with a radial bore 27 of the shaft 10, and this bore 27 in turn communicates with an axial bore 28 through which the compressed air is discharged. Thus, the compressed air can flow through the groove 26 and the bores 27 and 28 to the exterior. This compressed air can also discharge to the exterior through the clearance space provided between the sleeve 12 and the end wall 24, on the one hand, and the sleeve 11 and the end wall 25, on the other hand, the inner peripheries of the circular end walls 24 and 25 surrounding the outer end portions of the sleeves 12 and 11 as well as the elements 13 and 14 with a predetermined clearance through which the compressed air can escape to the exterior atmosphere.

If, for example, a radial force acts on the hub 22 from above, as, for example, from the weight of the wheel 23, then the radial clearance or play above the shaft 10 will be smaller than below the shaft 10. The throttling ratios between the gaps 20, 21 and 29 from above and from below vary in inverse proportion, so that there is between the upper portion of the shaft 10 and the hub 22 a larger radial force than between the lower portion of the shaft 10 and the hub 22, and this larger radial force opposes downward movement of the wheel, so that in this way the wheel is automatically maintained with a layer of air between the inner surface of the hub 22 and the shaft 10 as well as the sleeves 11 and 12, and in the same way the structure acts in the axial direction to maintain at all times during the operation of the structure when there is a flow of compressed air into the bore 15, a layer of air between the end walls 24 and 25 and the sleeves 12 and 11, respectively. This latter action serves to maintain the wheel 23 axially centered.

Thus, this structure will reliably prevent any mechanical contact between the shaft 10 and sleeves 12 and 11, on the one hand, and the hub 22, on the other hand, so that the wheel 23 is supported in this way for rotation with the frictional resistance to the rotation reduced to an absolute minimum which for practical purposes can be neglected even for the finest, most accurate measurements.

Of course, it is conceivable that the wheel could be supported with a predetermined amount of friction which would be maintained substantially constant so that it could be allowed for in making the measurements as described below, but an arrangement as described above where there is practically no friction is of even greater accuracy.

The rotary means or wheel 23 includes in addition to the hub 22 a circular plate 30 fixed at its inner periphery to the hub 22 and surrounding the latter, this plate 30 being located in a plane normal to the axis of the hub 22, and a cylindrical member 31 is fixed at its left end, as viewed in FIG. 2, to the disc 30 coaxially with the hub 22 which is thus surrounded by the ring or cylinder 31. An outer annular wall which is parallel to the plate 30 is fixed to the outer side edge of the cylinder 31 which is a distance from the plate 30 so that an annular channel is formed on the outside of the ring 31 surrounding the latter, this channel extending between the plate 30 and the ring 32, and a plurality of partitions 33 are arranged between the plate 30 and the ring 32 engaging the exterior surface of the ring 31, these partitions 33 being uniformly distributed about the axis of the rotary means 23 and extending radially with respect to this axis, as is evident from FIG. 1, so that in this way the wheel or rotary means 23 carries a plurality of pockets 34 uniformly distributed about the axis of the wheel 23 and directed away from this axis.

As is particularly evident from FIG. 1, the particulate material 2 falling from the left free end 35 of the chute 3 of the supply means falls substantially along a straight line 36 extending through the axis of the wheel 23. This action is brought about by locating the end 35 of the chute 30 at a horizontal distance to the right of the axis of the wheel 23, as viewed in FIG. 1, which is greater than the horizontal distance through which the particulate material 2 advances to the left from the time it drops off the end 35 of the chute 3 until it engages the wheel, and as a result the vector 36 which indicates the impact force of the particulate material extends through the axis of the shaft 10 and therefore does not provide any unbalanced forces which will disturb the measurements. As a result of this arrangement the kinetic enery and impact of the particulate material on the rotary means 23 can be ignored.

Of course, the particulate material engaging the wheel 23 will tend to turn the wheel when it is still stationary in one direction or the other depending on the haphazard manner in which the particulate material engages the wheel, and thus at the beginning of the operation the wheel 23 will be turned either in a clockwise or in a counterclockwise direction simply as a matter of chance. The direction of rotation taken initially by the wheel 23 is immaterial, however, the fact that the wheel 23 is free to rotate in either direction is of considerable importance. It is, of course, possible to provide a structure of relatively low friction which will limit the wheel 23 to one direction of rotation, but it is preferred to eliminate any such structure even if it is of a low friction and to allow the wheel 23 simply to turn in either direction. Because it is not known in which direction the wheel 23 will turn, a pair of funnels 37 are carried by the base plate 7 (FIG. 1) so that one of these funnels 37 will receive the particulate material which falls from the wheel 23 during rotation of the latter, and irrespective of which of the funnels 37 receives the particulate material, this particulate material will flow downwardly through the funnel onto a conveyor belt 38 which transports the material in the direction of the arrow 39 to a desired location.

The rotation of the wheel 23 is retarded by a suitable braking means in accordance with the present invention, and in the illustrated example this braking means includes a ring 40 which in fact forms an annular portion of the wheel 23 and which is fixed to the wheel 23, this ring or annular member 40 being made of copper or any other material which is electrically conductive to a high degree. The base plate 7 carries beneath the hub 22 of the wheel 23 a permanent magnet 41 of U-shaped configuration, and the legs 42 and 43 of the magnet 41 terminate in the poles of the magnet and define between themselves the gap 44 through which the annular member 40 freely turns with a predetermined clearance, as is evident from FIG. 1 and 2. A conduit 45 leads from a source of compressed air to the permanent magnet 41 and communicates with a pair of discharge nozzles 46 (FIGS. 1 and 2) which direct a stream of air through the gap 44 so that it is not possible for any dust or other foreign bodies to become located in this gap and thus the ring 40 can turn freely in the gap 44 between the poles of the permanent magnet.

This braking means thus forms an eddy-current brake which is responsive to the speed of rotation of the wheel 23. Thus, depending upon the turning moment applied to the wheel 23 by the particulate material 2 falling onto the wheel 23, the wheel 23 will continue to accelerate until it reaches a certain speed which is exactly counterbalanced by the braking force of the eddy-current brake, and then the wheel will continue to rotate at this constant speed as long as the rate of flow of the particulate material 2 mains constant. Thus, where the rate of flow of the particulate material is of a relatively small value the turning moment and thus the speed of rotation imparted to the wheel 23 by the falling particulate material will be relatively small and thus the eddy-current brake will act to maintain the wheel turning at a relatively low speed of rotation, while, on the other hand, if the rate of flow of the particulate material is relatively great a relatively large turning moment will be imparted by the falling particulate material to the wheel which will therefore turn at a relatively high speed at which it will be maintained by the eddy-current brake means. It is therefore possible to determine the rate of flow of the particular material either from the turning moment or from the speed of rotation of the wheels 23, and it is possible to measure either this turning moment or the speed of rotation so as to determine the rate of flow.

In the illustrated example a measuring means is provided for measuring the speed of rotation, and in accordance with the invention this speed of rotation of the rotary means 23 is measured without any structure engaging the wheel 23 so as to frictionally influence in an undesirable manner the rotation thereof. The ring 40 also forms part of the structure for measuring the speed of rotation of the wheel 23, and for this purpose an annular portion 47 of the wheel 40, this annular portion 47 being concentric with the hub 22, is formed with a series of openings 48 passing through the ring 40 and uniformly distributed about the axis of wheel 23. This speed measuring means of the invention further includes an optical-electric structure, and this structure is shown most clearly in FIG. 3. Thus, referring to FIG. 3 it will be seen that a light source in the form of a lamp 49 is located on one side of the member 40 in alignment with the circle of openings 48 thereof, while an optical-electric element 50 in the form of a photodiode is located on the other side of the annular portion 47 of the wheel 23, so that as the openings 48 become successively aligned with the light source 49 and the optical-electric element 50 there will be successive light impulses imparted to the photodiode 50, and thus these light impulses will be converted by this optical-electric transducing structure into electrical impulses which can be used in a known way for determining the speed of rotation of the wheel 23.

As is apparent from FIG. 3, a pair of housing portions 51 enclose the light source 49 and optical-electric element 50 so as to protect these units, and a pair of conduits 52 lead from the source of compressed air to the housing portions 51 to supply compressed air to the interior of the latter. The housings 51 are formed with openings 53 located along the line extending between the light source 49 and the optical-electric transducer 50, so that the compressed air will escape through the openings 53 to the outer atmosphere, and this compressed air thus renders it unnecessary to locate glass discs or the like at the openings 53 so that there is no undesirable diminishing in the intensity of the light issuing from the light source 49 and also the problem of cleaning away dust and other foreign bodies from such glass discs is completely eliminated. Furthermore, the compressed air issuing through the openings 53 guarantees that the openings 48 remain clean and unblocked since the air flows through these openings 48 to maintain the latter at all times in the best possible condition.

Thus, when the wheel 23 rotates at the constant speed the photodiode 50 will receive light impulses at uniform intervals and these light impulses are converted into current impulses. Since the rate of flow of the particulate material is indicated by the speed of rotation of the wheel 23, the number of light impulses and thus the number of current impulses in a given unit of time is indicative of the rate of flow of the particulate material.

As may be seen from FIG. 1, the photodiode 50 is connected to a pair of electrical leads 54 and 55 to a measuring device 56 of known construction capable of using these electrical impulses to turn a pointer 57 to a given angular position along a scale 58, and this scale 58 is provided with suitable indicia so that it is possible to read from the pointer 57 and the scale 58 the rate of flow of the particulate material at any instant. A ring or sleeve 59 is carried by the device 56 coaxially surrounding the scale 58 and turnable around the latter, and this ring 59 carries an index 59a which is capable of being set at a desired value along the scale 58 so as to indicate a preselected rate of flow of the particulate material. This sleeve 59 and index 59a may be used for regulating the rate of flow so as to bring it to a desired value or it may simply be used to indicate the desired rate of flow which can then be obtained by manual adjustments. Thus, the motor 6 may be manually regulated to act on the variable resistor 6a for regulating the magnet assembly 5 so as to cause the rate of flow to increase or decrease until the pointer 57 indicates by alignment with the index 59a that the required rate of flow of the particulate material is obtained.

FIG. 4, however, shows an arrangement for automatically producing this regulation. As may be seen from FIG. 4, the manually operable preselecting ring or sleeve 59 carries a pair of contact segments 60 and 61 which are connected to the motor 6 through electrical conductors 62 and 63, the conductor 62 being electrically connected with the contact segment 61 while the conductor 63 is connected electrically with the contact segment 60. These leads 62 and 63 may either be connected directly to the motor 6 or they may be connected to the motor 6 through suitable relays. In the position of the parts shown in FIG. 4 it is assumed that the rate of flow of the particulate material is less than the desired rate of flow, and the contact 60 which is connected through the finger 64 and the lead 65 as well as through the lead 63 with the motor 6 will act to actuate the motor 6 to set the variable resistor 6a at a setting which will produce greater vibrations and thus a higher rate of flow. The turnable electrically conductive finger 64 is aligned with and turns with pointer 57 and the conductor 65 completes the circuit through the motor 6 in a known way. Of course, if the rate of flow is greater than desired the finger 64 will be in engagement with the contact 61 and at this time the motor 6 will be automatically actuated to set the variable resistor 6a so as to reduce the rate of flow of the particulate material. The index 59a shown in FIG. 1 is located at the gap between the contacts 60 and 61 and when the finger 64 reaches the gap between the contacts 60 and 61 the motor 6 will remain in the position it has reached and thus the apparatus will be automatically adjusted. Of course, it is the frequency of electrical impulses transmitted from the transducer to the device 56 which turns the finger 64 as well as the pointer 57 so as to indicate the increasing or decreasing rate of flow of the particulate material. In order to prevent this automatic structure from continuously varying the rate of flow because of over-sensitivity, a suitable yieldable damping device which is not illustrated is connected to the structure so as to reduce its sensitivity. Of course, the above-described regulating structure can be exchanged for other regulating structures which may operate as well, and the adjustment and regulation of the drive of the vibrator of the chute 3 can also be carried out, for example by suitably influencing the phase of the alternating exciting current.

The magnet 41 can be removably mounted on the base plate 7 so that it can be exchanged for other magnets of different sizes in the event that each magnet will operate only through a certain range of speeds, so that in this way it is possible to provide different magnets for different ranges of speeds. Also, it may be desired to provide different rates of flow of the particulate material while maintaining the same speed of rotation of the rotary means 23, and by providing interchangeable magnets 41 of different sizes it is also possible to provide different braking forces from the eddy-current brake means and thus provide rates of flow for the same speed of rotation of the rotary means.

Furthermore, instead of a permanent magnet it is possible to use an adjustable electromagnet, and by regulating such an electromagnet it is also possible to provide with a constant speed of rotation of the rotary means 23 different rates of flow of the particulate material.

It will be noted that with the structure of the invention the clinging of any of the particulate material to the rotary means 23 will have absolutely no influence on the accuracy of the device since the clinging material will necessarily be uniformly distributed about the axis of the rotary means 23, and moreover such clinging material will have no undesirable influence since the turning moment induced by such clinging material, integrated over a single revolution, is equal to zero.

A supply means as described above is particularly preferred since with a vibrating chute 3 as described above, the change in the rate of supply will produce only changes in the amplitude of the vibrator while maintaining a substantially constant horizontal rate of movement of the particulate material so that the ideal condition where the falling particulate material provides an impact vector 36 extending through the axis of the wheel 23 is reliably maintained even with changing rates of flow of the particulate material.

Furthermore, a light source such as the lamp 49 is not essential and it is possible to provide a transducer which will operate without such a light source, but in this event the transducer must be much more sensitive and is therefore much more expensive.

It will be noted that the above-described method and means of measuring the speed of rotation of the wheel 23 takes place without any frictional engagement of this wheel by any measuring structure, so that there is no influence on the rotation of the wheel by the measuring structure.

It will be understood that each of the elements described above, or two or more together, may also find a useful application in other types of measuring process and apparatus differing from the types described above.

While the invention has been illustrated and described as embodied in process and apparatus for measuring the rate of flow of a particulate material, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. Apparatus for measuring the rate of flow of a particulate solid material, comprising, in combination, a rotary wheel having a substantially horizontal axis of rotation and carrying a plurality of pockets distributed uniformly about and directed away from said axis; support means supporting said wheel for rotation about said axis; support means cooperating with said wheel for dropping particulate material onto said wheel into the pockets thereof for rotating said wheel about said axis; brake means the effect of which increases as the speed of said wheel increases, said brake means being located adjacent said wheel for retarding the rotation thereof; means responsive to the speed of rotation of said wheel; and means coordinating with said last-mentioned means to measure the said rate of flow.

2. Apparatus as recited in claim 1 and wherein said brake means is an eddy-current brake means.

3. Apparatus for determining the rate of flow of a particulate solid material comprising, in combination, a rotary wheel having a substantially horizontal axis of rotation and carrying a plurality of pockets distributed uniformly about and directed away from said axis; support means supporting said wheel for rotation about said axis; supply means cooperating with said wheel for dropping particulate material onto said wheel into the pockets thereof for rotating said wheel about said axis; brake means the effect of which increases as the speed of said wheel increases, said brake means being located adjacent said wheel for retarding the rotation thereof; means responsive to the speed of rotation of said wheel; and means coordinating with said last-mentioned means to measure the rate of flow and with said supply means for automatically actuating the latter in response to the measured rate of flow to provide a predetermined rate of flow.

4. Apparatus as recited in claim 1 and wherein said means responsive to the speed of rotation of said wheel includes an annular portion of said wheel extending coaxially around said axis thereof and formed with a plurality of openings distributed uniformly around said axis and an optical-electric means cooperating with said annular portion of said wheel for converting light passing through said openings to said optical-electric means into electrical impulses.

5. In a process for measuring the rate of flow of a particulate solid material, the steps of dropping particulate material into the pockets of a rotary wheel which has a substantially horizontal axis of rotation, which has said pockets distributed uniformly about and directed away from said axis, and which is supported for rotation about said axis, to rotate said wheel about said axis; braking the rotation of said wheel with a braking force which increases as the speed of said wheel increases; and measuring the rate of flow in response to the speed of rotation of said wheel.

References Cited in the file of this patent
UNITED STATES PATENTS

| | | |
|---|---|---|
| 926,761 | Oliver | July 6, 1909 |
| 1,950,810 | Nichols | Mar. 13, 1934 |
| 1,957,681 | Thompson | May 8, 1934 |
| 2,020,997 | Dallmann | Nov. 12, 1935 |
| 2,402,719 | Allison | June 25, 1946 |
| 2,610,350 | Smith | Sept. 16, 1952 |
| 2,654,246 | Pfau | Oct. 6, 1953 |
| 2,857,761 | Bodge | Oct. 28, 1958 |
| 2,872,074 | Birtwell et al. | Feb. 3, 1959 |
| 2,882,937 | Kay | Apr. 21, 1959 |
| 2,889,474 | Macks | June 2, 1959 |
| 2,914,943 | Ballard | Dec. 1, 1959 |
| 2,951,729 | Skarstrom | Sept. 6, 1960 |

UNITED STATES PATENT OFFICE
CERTIFICATE OF CORRECTION

Patent No. 3,135,426                                                 June 2, 1964

Rudolf Müller et al.

It is hereby certified that error appears in the above numbered patent requiring correction and that the said Letters Patent should read as corrected below.

Column 9, line 2, for "support" read -- supply --.

Signed and sealed this 13th day of October 1964.

(SEAL)
Attest:

ERNEST W. SWIDER                                         EDWARD J. BRENNER
Attesting Officer                                              Commissioner of Patents